United States Patent [19]

Kernal

[11] Patent Number: 4,809,989
[45] Date of Patent: Mar. 7, 1989

[54] COIL SPRING SUPPORTED SEALING ELEMENT AND DEVICE

[75] Inventor: Dickie L. Kernal, Carrollton, Tex.

[73] Assignee: Otis Engineering Corporation, Dallas, Tex.

[21] Appl. No.: 58,938

[22] Filed: Jun. 5, 1987

[51] Int. Cl.$^4$ ............................................. F16J 15/12
[52] U.S. Cl. ..................................... 277/30; 277/163; 277/164; 277/31; 267/1.5
[58] Field of Search .................. 277/30, 31, 149, 150, 277/157, 163, 164, 165; 267/1.5

[56] References Cited

U.S. PATENT DOCUMENTS

| | | |
|---|---|---|
| 735,731 | 8/1903 | Draver ................................. 277/164 |
| 2,192,805 | 3/1940 | Seamark ............................... 277/31 |
| 2,390,372 | 12/1945 | Johnston et al. ................. 277/164 X |
| 2,988,148 | 6/1961 | Conrad et al. . |
| 3,099,455 | 7/1963 | Mayfield ............................ 277/163 |
| 3,118,682 | 1/1964 | Fredd . |
| 3,215,208 | 11/1965 | Tamplen . |
| 3,227,462 | 1/1966 | Tamplen . |
| 3,278,192 | 10/1966 | Tamplen . |
| 3,278,219 | 10/1966 | Elliston . |
| 4,509,763 | 4/1985 | Fischer ............................. 277/163 |

FOREIGN PATENT DOCUMENTS

| | | |
|---|---|---|
| 164392 | 11/1905 | Fed. Rep. of Germany ...... 277/164 |
| 80830 | 5/1963 | France ................................. 277/164 |
| 443082 | 2/1936 | United Kingdom ................ 277/163 |

*Primary Examiner*—Robert S. Ward
*Attorney, Agent, or Firm*—Roland O. Cox

[57] ABSTRACT

An improved sealing device, which when positioned inside a flow conductor and operated, compresses and expands an improved resilient element into fluid sealing engagement between the sealing device and the inside of the flow conductor. The sealing device is provided with centralizing lugs, which automatically extend to centralize the improved resilient element on sealing engagement in the flow conductor, assuring an increased pressure resistant seal. The improved resilient element has end supports including a reinforced coil spring in each end to prevent pressure extrusion of the resilient material and when sealingly engaged, functions as a cup type sealing element. Two forms of wire reinforcement for the coil spring are disclosed, both of which provide further increased resistance to pressure sealed. The improved sealing element may be provided with an outer layer of softer resilient material to assure sealing in rough flow conductors.

44 Claims, 4 Drawing Sheets

COIL SPRING SUPPORTED SEALING ELEMENT AND DEVICE

BACKGROUND OF THE INVENTION

1. Field of the Invention:

This invention relates to improvements in sealing devices useful in flow conductors. More specifically, the invention relates to sealing devices or packers for wells, which may be positioned in a well flow conductor and operated to compress and expand an improved resilient sealing element carried on the device, into sealing engagement with the flow conductor. When sealingly engaged, the expanded sealing element functions as a cup type sealing element or packer 2. Description of Related Art The following U.S. patents, all to J. W. Tamplen and incorporated herein for reference, disclose sealing devices using sealing elements provided with anti-extrusion members in the form of coil springs, molded into the elements at each end, to prevent pressure extrusion of the resilient sealing material and enable the sealing element and device to seal against higher pressures:

U.S. Pat. No. 3,215,208 patented Nov. 2, 1965
U.S. Pat. No. 3,227,462 patented Jan. 4, 1966
U.S. Pat. No. 3,278,192 patented Oct. 11, 1966

An U.S. Pat. No. 3,278,219, which issued to T. L. Elliston Oct. 11, 1966, discloses the use of a sealing element, having coil springs molded into each end to prevent extrusion, on a well tool for retrieving objects from a well.

Another U.S. Pat. No. 3,118,682, to John V. Fredd issued Jan. 21, 1964. This patent discloses the use of an expandable metal backup member at one end of an elastic seal member.

Another U.S. Pat. No. 2,988,148 issued June 13, 1961 to Martin B. Conrad and John F. Muse, discloses a packing element that when expanded into sealing engagement with a well conduit functions as a cup type seal or packer as an increase in pressure sealed causes the cup type seal to seal tighter. The cup type seal disclosed in this patent does not utilize coil springs in both ends to prevent extrusion of the sealing material.

The use of coil springs in the ends of expandable resilient sealing elements, to prevent pressure extrusion of the sealing material, has enabled sealing elements which function as cup packers when sealing to continue to seal when subjected to pressures high enough to cause failure of sealing elements having no coil springs.

Failure of sealing elements, which function as cup type seals and utilize coil springs to prevent pressure extrusion, have occurred in deep, hot hydrocarbon wells where the resilient sealing material has been softened by high earth temperatures and the pressure holding capabilities of these sealing elements have been exceeded. These failures cause loss of well production and could cause loss of well pressure control resulting in well blowout with possible damage to the well and well equipment and danger to property and lives.

SUMMARY OF THE INVENTION

Analysis of prior sealing elements which failed in wells and tests of this type sealing element to failure revealed the coils of the springs used in the element ends to prevent pressure extrusion are tilted or were forced to lay in a more tangential direction from a radial direction when the sealing element ends expand because expansion and spring elongation creates clearances between coils into which the coils may tilt. Localized tilting or flattening of coils is caused by the sealing device not being centered in the flow conductor when the seal element is expanded to seal.

The diameter of the end spring coils are purposely made greater than the annular clearance between the sealing device and the inside of the flow conductor, so when the coils are more radially directed, the coil diameter bridges the annular clearance to effectively prevent extrusion of the resilient seal material. When pressure forces tending to extrude resilient material through the annular clearance are high enough, the already tilted coils are forced into the annular clearance and tilted more toward a tangential direction, further reducing their bridging height and resistance to resilient material extrusion.

This invention provides a means of centralizing the sealing element and a means of limiting the tangential tilt of the coils in the end springs, both of which provide greater seal end support and resistance to extrusion of the sealing element material at the ends, which enables the sealing element and device to seal greater pressures.

One object of this invention is to provide a sealing element for a sealing device having improved expandable end supports.

Another object of this invention is to provide a sealing device utilizing the improved sealing element and having means for compressing and expanding the element to seal in a flow conductor.

Also an object of this invention is to provide a sealing device useful for sealing in a flow conductor, which utilizes the improved sealing element and includes means limiting the compression setting stroke to control expansion of the sealing element, releasable means locking the device in limited stroke position and centralizing means which centralize the sealing device automatically when operated to seal in the flow conductor.

Figure 1:
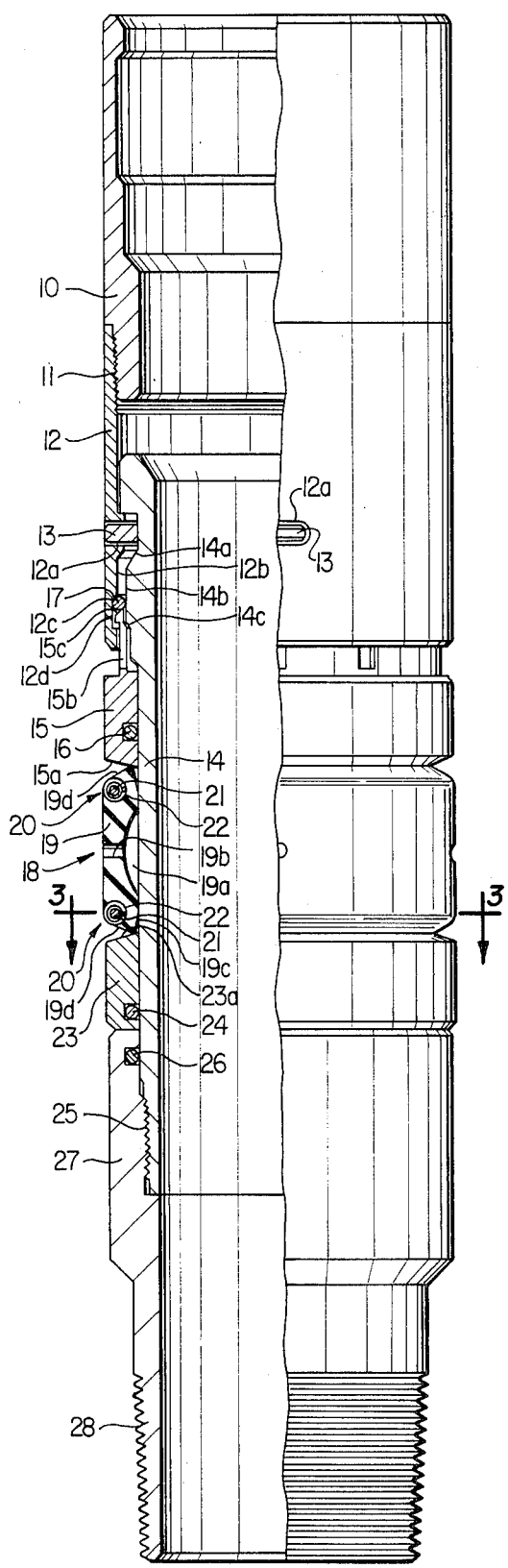
FIG. 1 is a half sectioned drawing of the sealing device of this invention having an improved sealing element of this invention.

Around mandrel 14 below the sealing element is a lower expander 23, which is sealed to the mandrel with resilient seal 24 and has a frusto-conical end surface 23a. Element end surfaces 19d are sealingly engageable with upper expander surface 15a and lower expander surface 23a.

Connected to the lower end of the mandrel by thread 25 and sealed by resilient seal 26 is a connector 27. The connector has a thread 28 for connecting the sealing device to other well tools used in flow conductors.

To use the sealing device of FIG. 1, a well tool is connected to connector 27 and the sealing device fish neck 10 is releasably connected to a running tool. If the flow conductor is known to have a rough inside surface, a sealing element 18 of the type shown in FIG. 10 should be used on the sealing device. The running tool and sealing device are then lowered to the desired level in the flow conductor at which the connected tool is set in the flow conductor or lands on a support so the sealing device fish neck may be jarred down or weight applied to it through the running tool, moving fish neck 10 downwardly. Downward movement of fish neck 10 moves sleeve 12 with surface 12c slightly downward over mandrel 14 to contact wire segment 17 and move it into contact with surface 15c on upper expander 15.

Figure 2:
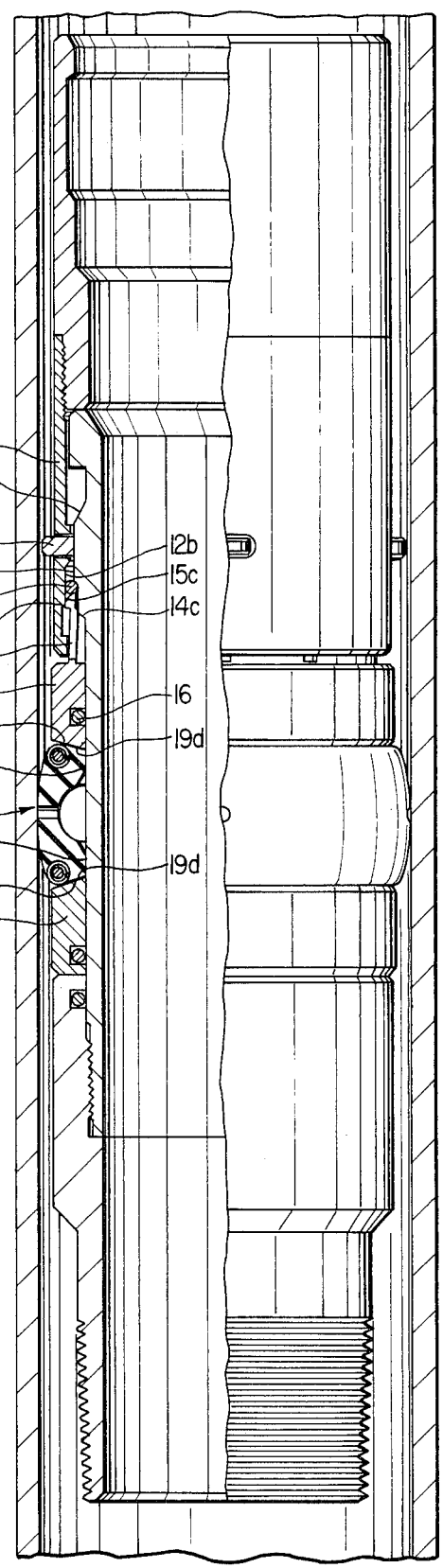
FIG. 2 is a half sectioned drawing of the sealing device of FIG. 1 which has been positioned and operated to seal in a flow conductor.

Further downward movement of the sleeve moves centralizer lugs 13 along mandrel surface 14a, camming them outwardly until they are moved over mandrel surface 14b. At the same time upper expander 15 was moved down through surface 12c, wire segments 17 and surface 15c sliding seal 16 along the outside of mandrel 14. Also, sealing element 18 was compressed between expanders 15 and 23 and expanded until wire segments 17 are cammed inwardly by surface 12c to mandrel surface 14c. The sealing element has expanded and is sealingly engaging the inside of the flow conductor, element surfaces 19c are sealingly engaged around mandrel 14 and element end surfaces 19d are sealingly engaged with expander surfaces 15a and 23a. Now further down travel of sleeve 12 moves sleeve bore 12b down over wire segments 17, locking them under mandrel surface 14c and locking upper expander 15 in a limited stroke position which retains sealing element 18 expanded in sealing engagement. Final downward travel of sleeve 12 moves surface 12c to contact collet finger cam surfaces 15c and cam collet fingers 15b inwardly until sleeve bore 12b can pass over the collet fingers to retain them cammed in under wire segments 17 as shown in FIG. 2. The running tool is then released from the sealing device and removed from the flow conductor.

To retrieve the sealing device from the flow conductor, an appropriate pulling tool is lowered to engage fish neck 10. On lifting the engaged pulling tool, sleeve 12 is moved upwardly over mandrel 14 permitting the collet fingers 15b to move outwardly into sleeve recess 12d and pulling the collet fingers and upper expander 15 upwardly. The collet fingers push wire segments 17 up surface 14c which cams them outwardly to be pushed along mandrel surface 14b, until sleeve 12 returns to its full upward position as shown in FIG. 1. The sealing element is now free to extend and contract from sealing engagement with the flow conductor, expanders and mandrel and lugs 13 are free to move inwardly. Continued lifting of the pulling tool will remove the sealing device and connected tool from the flow conductor.

Figure 3:
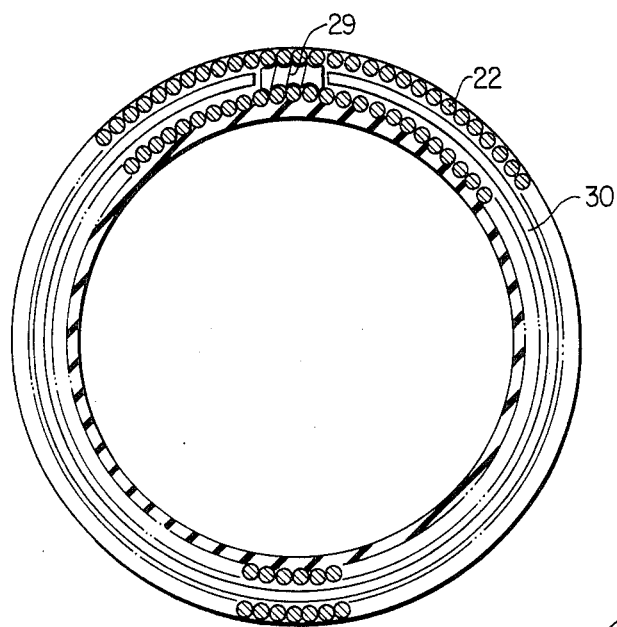
FIG. 3 is a drawing of a cross section of the improved seal element of this invention, along line 3—3 of FIG. 1, showing a single strand of reinforcing wire in the element end supporting coil spring and the spring ends connected by a threaded connector.

The sealing element 18 (FIGS. 1 and 10) of this invention has improved end supports 20 which utilize a threaded connector or welding to connect the ends of body end supporting coil springs 22 after inserting a single or multistrand reinforcing wire 21 in the coil springs. FIGS. 3, 4, 5 and 6 show the use of a threaded connector 29, which has been threaded with a half wire diameter plus profile and on a helix angle equal to that of the coils in the solid wound coil spring. FIG. 3 shows a single strand of wire 30 which has been cut once and inserted into coil spring 22. Each end of the coil spring has been twisted a few unscrewing turns so when each end is brought in contact with the threaded connector and released it will screw itself halfway on to the connector. End supports 20, assembled as described, are positioned in a resilient material mold cavity and are molded into the ends of element body 19 as it is formed.

Figure 4:
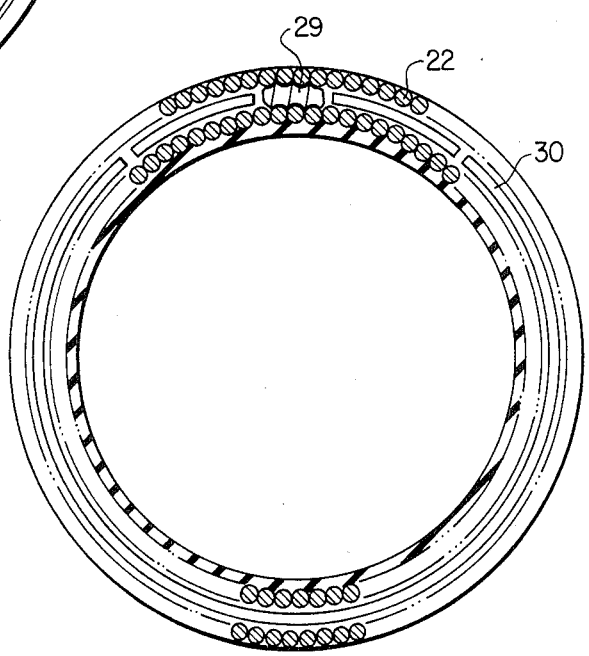
FIG. 4 is the same as FIG. 3 except the wire has been cut into sections.

FIG. 4 shows the single wire has been cut more than once into sections to facilitate twisting to unscrew and screwing the coil spring ends on to the connector.

Figure 5:
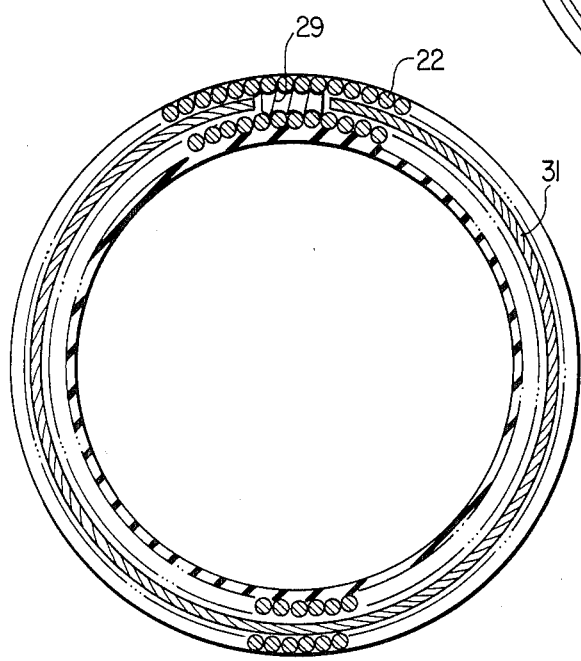
FIG. 5 is the same as FIG. 3 except the wire has more than one strand.

FIG. 5 shows use of a wire (or cable) 31 having more than one strand and cut once, in coil spring 22.

Figure 6:
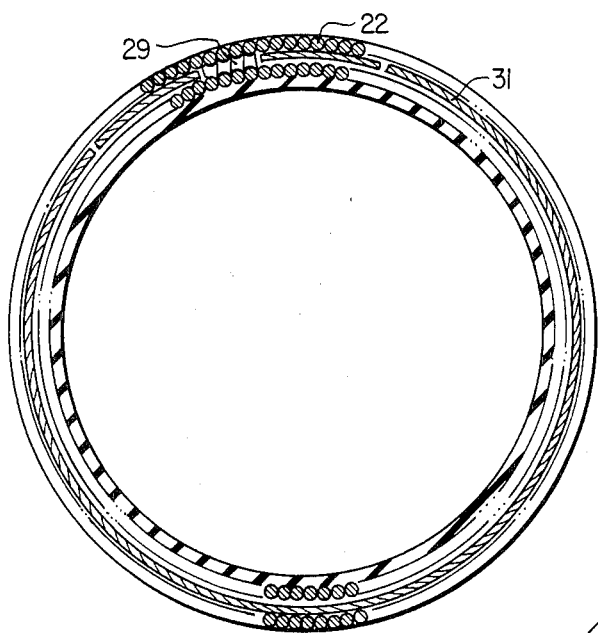
FIG. 6 is the same as FIG. 3 except the stranded wire has been cut into sections.

FIG. 6 shows the use of a multistrand wire 31, cut more than once into sections, in coil spring 22 whose ends are connected by threaded connector 29.

Figure 7:
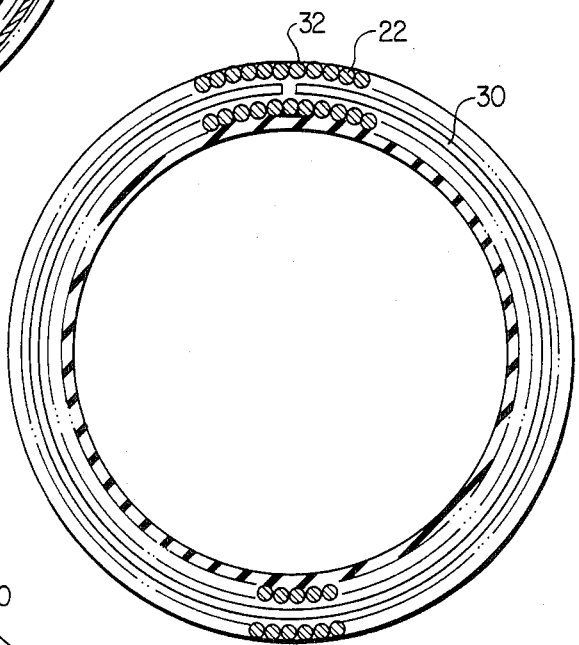
FIG. 7 is a drawing of a cross section of the improved seal element of this invention, along line 3—3 of FIG. 1, showing a single strand of reinforcing wire in the element end supporting coil spring and the spring ends connected by welding.

FIG. 7 shows a single wire 30 which has been cut once and inserted into a coil spring 22, the ends of which have been connected by weld 32.

Figure 8:
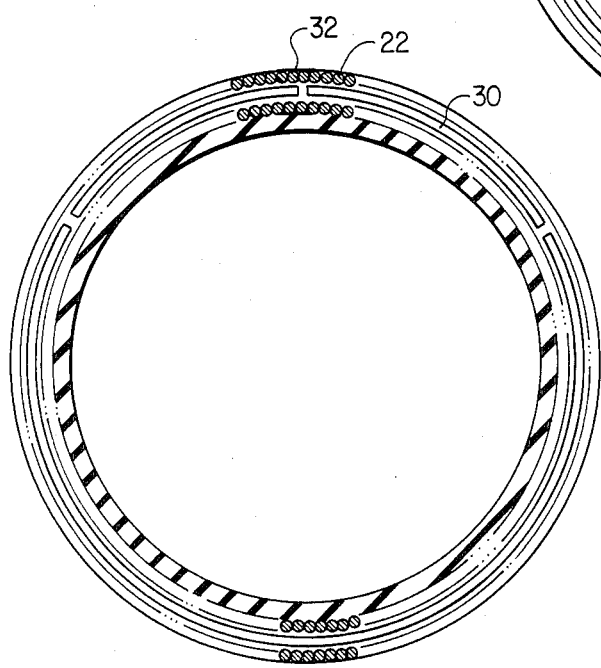
FIG. 8 is the same as FIG. 7 except the wire has been cut into sections.

FIG. 8 shows use of a single strand of wire 30, cut more than once into sections and inserted into the coil spring before connecting the ends by welding.

Figure 9:
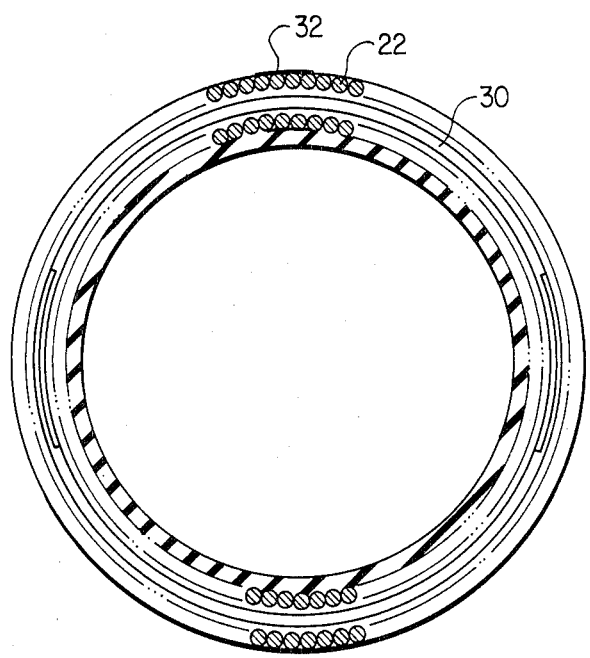
FIG. 9 is the same as FIG. 7 except the ends of the wire have been cut to overlap.

FIG. 9 shows a single strand of wire 30, with ends cut to overlap, inserted into coil spring 22 whose ends have been connected by welding.

Figure 10:
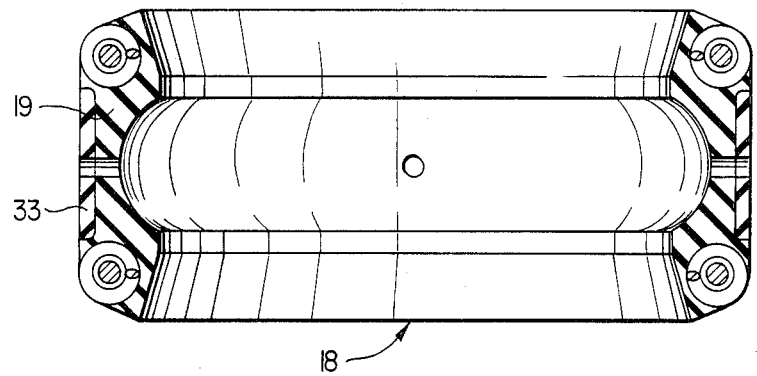
FIG. 10 is a drawing in section of the seal element of this invention showing a layer of softer resilient material on the outside. The invention sealing device is shown in FIG. 1 ready to be positioned in a well flow conductor. The device has an internal fishing neck 10 which is releasably connectable to a running tool. The fishing neck is connected to sleeve 12 with thread 11. There are a number of slots 12a in the sleeve and a radially slidable centralizing lug 13 is positioned in each slot. The sleeve is slidably disposed around a mandrel 14 and has a bore 12b, a camming surface 12c and a recess 12d in bore 12b. The mandrel has camming surfaces 14a and 14c and outside surface 14b. There is an upper expander 15 slidably mounted on and sealed to the mandrel with resilient seal 16. This expander has a frusto-conical end surface 15a, a number of collet fingers 15b and each finger has a camming surface 15c. Disposed around the mandrel between camming surfaces 12c and 15c are arcuate wire segments 17. Also around the mandrel is an improved expandable sealing element 18 of this invention. This sealing element has a resilient material body 19 and improved expandable end supports 20, which are formed by inserting a wire or wires 21 into a solid wound coil spring 22 and connecting the spring ends. The body 19 has an internal recess 19a and at least one lateral opening 19b communicating recess 19a with the exterior of the element body. Body 19 also has internal frusto-conical surfaces 19c, which are sealingly engageable with the outside of mandrel 14 and frusto-conical end surfaces 19d.

FIG. 10 shows improved sealing element 18 of this invention having an outer layer of softer resilient material 33 on body 19.

What I claim is:

1. An expandable sealing element comprising:
  (a) a cylindrical resilient material body having a bore therethrough, a central internal recess in said bore and a lateral port in said recess communicating said bore with the exterior of said sealing element; and (b) expandable support means in said body outer surface at each end including a solid wound coil spring having a wire therein, and means connecting said spring ends.

2. A sealing element according to claim 1 wherein the means connecting the coil spring ends is a threaded connector screwed into each spring end.

3. A sealing element according to claim 2 wherein the wire in the coil spring is single strand.

4. A sealing element according to claim 2 wherein the wire in the coil spring has more than one strand.

5. A sealing element according to claim 3 wherein the strand of wire is cut into sections.

6. A sealing element according to claim 4 wherein the strands of wire are cut into sections.

7. A sealing element according to claim 3 wherein the wire is cut into sections so that the ends of the adjacent sections overlap.

8. A sealing element according to claim 3 wherein the outside diameter of the strand is at least 0.010 inches less than the inside diameter of the coil spring.

9. A sealing element according to claim 4 wherein the diameter over the strands together is at least 0.010 inches less than the inside diameter of the coil spring.

10. A sealing element according to claim 1 wherein the means connecting the spring ends is welding.

11. A sealing element according to claim 10 wherein the wire in the coil spring is single strand.

12. A sealing element according to claim 10 wherein the wire in the coil spring has more than one strand.

13. A sealing element according to claim 11 wherein the strand of wire is cut in sections.

14. A sealing element according to claim 12 wherein the strands are cut in sections.

15. A sealing element according to claim 11 wherein the wire is cut into sections so that the ends of adjacent sections overlap.

16. A sealing element according to claim 11 wherein the outside diameter of the strand is at least 0.010 inches less than the inside diameter of the tension spring.

17. A sealing element in accordance with claim 12 wherein the diameter over the strands together is at least 0.010 inches less than the inside of the inside diameter of the tension spring.

18. A sealing element according to claim 1 wherein the resilient material body includes a layer of softer resilient material on the outside of said body.

19. An expandable sealing element for mounting around a mandrel between expanders slidably sealed to said mandrel and movable toward each other comprising:

(a) a cylindrical resilient material body having a bore therethrough, a central internal recess in said bore and a lateral port in said recess communicating said bore with the exterior of said sealing element;

(b) expandable support means in said body outer surface at each end including a solid wound coil spring having wire therein, and means connecting said spring ends; and (c) means on said sealing element ends for sealingly engaging said mandrel and said expanders when said expanders are moved toward each other expanding said element.

20. The expandable sealing element of claim 19 wherein the sealing means on the element ends are outer and inner frusto-conical sealing surfaces, said outer surfaces inclined convergently outwardly and said inner surfaces inclined convergently inwardly.

21. The expandable sealing element of claim 20 wherein the means connecting the support means spring ends is a threaded connector screwed into each spring end.

22. The expendable sealing element of claim 21 wherein the wire in the support means spring is single strand.

23. The expendable sealing element of claim 21 wherein the wire in the support means spring has more than one strand.

24. The sealing element of claim 22 wherein the strand of wire is cut into sections.

25. The sealing element of claim 23 wherein the strands of wire are cut into sections.

26. The sealing element of claim 22 wherein the wire is cut into sections so that the ends of the adjacent sections overlap.

27. The sealing element of claim 22 wherein the outside diameter of the strand is at least 0.010 inches smaller than the inside diameter of the support means spring.

28. The sealing element of claim 23 wherein the diameter over the strands together is at least 0.010 inches less than the inside diameter of the support means spring.

29. The sealing element of claim 20 wherein the means connecting the support means spring ends is welding.

30. The sealing element of claim 29 wherein the wire in the support spring is single strand.

31. The sealing element of claim 29 wherein the wire in the support means spring has more than one strand.

32. The sealing element of claim 30 wherein the strand of wire is cut in sections.

33. The sealing element of claim 31 wherein the strands are cut in sections.

34. The sealing element of claim 30 wherein the wire is cut in sections so that the ends of the adjacent sections overlap.

35. The sealing element of claim 30 wherein the outside diameter of the strand is at least 0.010 inches smaller than the inside diameter of the support means spring.

36. The sealing element of claim 31 wherein the diameter over the strands together is at least 0.010 inches less than the inside diameter of the support means spring.

37. A sealing device for sealing in a flow conductor comprising:

(a) a mandrel;

(b) seal element means mounted on said mandrel having expandable support means in each end thereof, each said support means including a solid wound coil spring having wire therein and means connecting said spring ends; and (c) longitudinally movable compressing means on said mandrel for compressing and expanding said seal element means, said compressing means including means limiting movement thereof along said mandrel, and releasable locking means for locking said compressing means at a limited movement compressed position and holding said seal means expanded.

38. A sealing device according to claim 37 wherein the compressing and expanding means further include means automatically centralizing the seal element means in the flow conductor when the seal element means is expanded to sealingly engage the flow conductor.

39. The seal device of claim 37 wherein the compressing means comprises:
(a) a lower expander around and sealed to said mandrel below said seal means;
(b) an upper expander having upwardly extending collet fingers, said expander slidably sealed around said mandrel above said seal element means; and
(c) a sleeve having an internal fish neck in its upper end, said sleeve mounted around and slidable on said mandrel to engage and move said upper expander from a first seal means retracted position toward said lower expander to a second seal means expanded position.

40. The sealing device of claim 39 wherein the seal element means further includes
a cylindrical resilient material body with a bore therethrough,
a central internal recess in said bore,
a lateral port in said recess communicating said bore with the exterior of said seal means, and means on the seal element means body for simultaneously sealingly engaging the mandrel and upper and lower expanders.

41. A sealing device according to claim 39 wherein the centralizing means comprises: p'(a) slots in the compressing means sleeve; and
(b) a lug slidably mounted for radial movement in each slot.

42. The sealing device of claim 39 wherein the means limiting movement of the compressing means comprises:
(a) a number of arcuate wire segments on the upper expander collet fingers between the compressing means sleeve and the mandrel;
(b) a camming surface in said sleeve spaced above said wire segments; and
(c) a camming surface on said mandrel spaced below said wire segments.

43. The sealing device of claim 42 wherein the locking means is a camming surface on the collet fingers engageable by the camming surface in the sleeve.

44. The sealing device of claim 40 wherein the seal element has a layer of softer resilient material around the resilient material body.

* * * * *